Nov. 19, 1957
H. N. RITTER
2,813,335
POTATO CUTTING PRESS
Filed Feb. 14, 1955
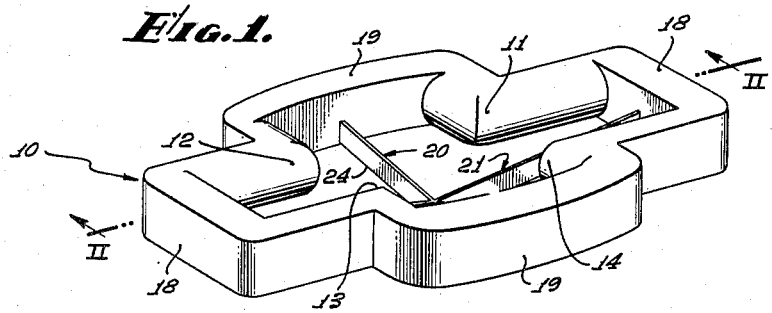
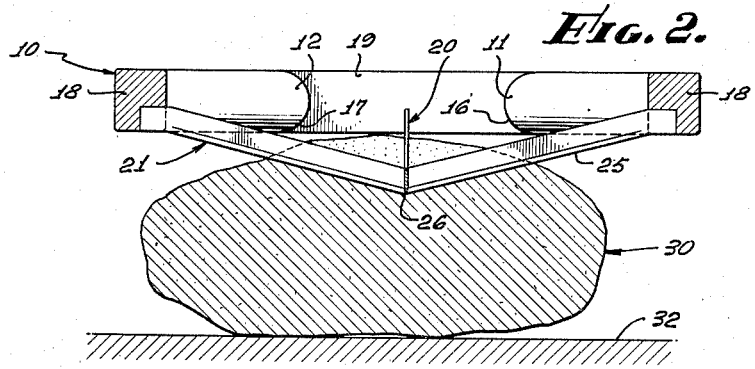
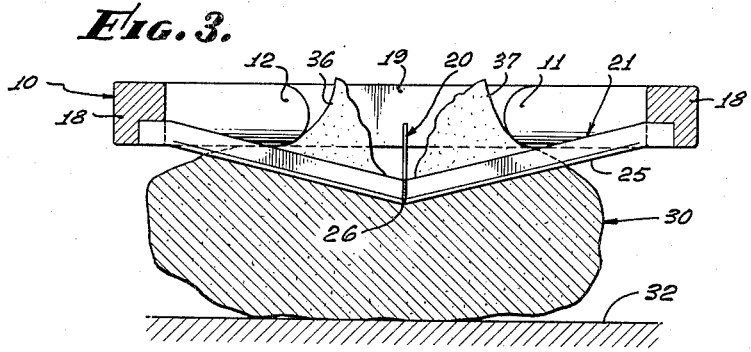
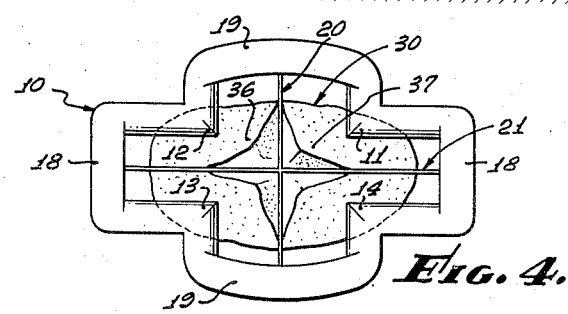
INVENTOR.
HAROLD N. RITTER
BY
ATTORNEY.

United States Patent Office 2,813,335
Patented Nov. 19, 1957

2,813,335
POTATO CUTTING PRESS
Harold N. Ritter, Rivera, Calif.
Application February 14, 1955, Serial No. 487,971
2 Claims. (Cl. 30—303)

This invention relates to cutting devices and particularly describes such an apparatus including a hollow, generally rectangular frame provided with cutting blades extending thereacross especially adapted for preparing a baked potato to be served.

Although the invention will be described primarily in connection with its use with potatoes, nevertheless it will be understood that other and additional uses are possible and are within the contemplation of the invention. As is well known, a baked potato is normally prepared for the table by making one or more cuts in the skin of the upper portion of the potato and then pressing downwardly upon the skin adjacent the cuts in order to force a portion of the potato meal upwardly through the cuts. Condiments, butter and the like may then be added into the potato meal. This procedure is normally clumsy to accomplish because the potato is hot and it is difficult to prevent burning one's fingers. The present invention accomplishes the cutting and opening of the skin in one simple operation and without the necessity of the user touching the potato with his fingers.

In its preferred form hereinafter described and shown, the present invention includes a frame desirably in the shape of a hollow, generally rectangular body, the frame being provided with a plurality of inwardly directed fingers. Extending across the hollow interior of the frame are one or more knives or cutting blades having downwardly directed cutting edges. Preferably two such blades intersect at the approximate center of the rectangular frame, and the frame fingers are disposed in the angles between intersecting blades. The cutting edges are preferably spaced downwardly from the plane of the frame fingers, so that in use the cutting edges contact and cut the skin of a potato before the fingers contact adjacent portions of the skin.

An object of the invention is therefore to disclose a novel cutting press particularly adapted for use with baked potatoes.

Another object of the invention is to provide a cutting press having smooth surfaced fingers and one or more knives whose cutting edges are downwardly directed and spaced generally below the fingers.

A further object of the invention is to disclose a device having the above characteristics including a pair of intersecting knives and wherein the fingers carried by the frame are disposed in the angular space between intersecting knives.

These and other and allied objects and purposes of the invention will become clear from the reading of the following description of a preferred embodiment thereof taken in connection with the accompanying drawing in which:

Fig. 1 is a perspective view of a preferred form of the present invention.

Fig. 2 is a sectional view taken on line II—II of Fig. 1 showing the cutting press mounted upon a potato after the initial cut has been made.

Fig. 3 is a view similar to Fig. 2 after the cutting press has been moved farther downwardly from its position shown in Fig. 2.

Fig. 4 is a top plan view of the potato and cutting press in the position shown in Fig. 3.

Referring now in detail to the drawing and first to Fig. 1 thereof, a cutting press in accordance with the present invention includes a frame indicated generally at 10 which is desirably rectangular in shape in order to conform roughly with the shape of a typical baked potato. The frame 10 includes a plurality of fingers 11, 12, 13 and 14 projecting inwardly into the hollow interior of the frame 10. The fingers are desirably but not necessarily formed integrally with the frame, and the entire frame and fingers may be conveniently made of a suitable rigid material such as metal, wood, plastic or the like. It will be noted that the entire frame is generally flat and, when horizontally disposed as shown in Figs. 2 and 3, the fingers are in horizontal alignment. Each of the fingers has a desirably rounded contour as seen for example at 16 in the case of finger 11 and at 17 in the case of finger 12 for purposes more fully understood hereinafter. Frame 10 includes end members 18 and side members 19 for convenience in manually grasping the device in use. The entire device is preferably symmetrical in design.

Means for cutting the skin of a potato are provided and in the present illustrative embodiment of the invention assumed the form of intersecting blades indicated generally at 20 and 21. The blades 20 and 21 extend across the hollow interior of the rectangular frame 10 and are fixed at their outer ends to side members of the frame 10 as by being embedded therein as shown.

Each of the blades 20 and 21 is provided with a downwardly directed cutting edge 24 and 25 respectively. These edges 24 and 25 desirably extend below the general plane of the frame 10 and in particular are below the smooth convex lower surfaces 16 and 17 of the fingers 11 and 12 respectively and of the corresponding surfaces of fingers 13 and 14 (not shown). In the present embodiment of the invention the cutting edges 24 and 25 are inclined downwardly toward the interior of the rectangular frame 10 so that the intersection 26 of the cutting edges 24 and 25 is at a point substantially below the general plane of the frame 10 and the cutting edges slope upwardly from said lowermost point 26.

Use of the present invention in connection with the preparation of a baked potato for serving is illustrated in Figs. 2 and 3, which show successive stages in the application of the cutting press to a potato. As there shown, a baked potato indicated generally at 30 rests upon a suitable horizontal supporting surface indicated generally at 32, such as a table or the like. The cutting press 10 is held by the user in generally horizontal orientation above the potato, with the cutting edges 24 and 25 of the cutting press directed downwardly. The press 10 is held in general vertical alignment above the potato with the intersection 26 of the cutting edges generally centered on the potato.

From this position, initial downward movement of the press causes the cutting edges 24 and 25 to cut the skin of the potato 30, the resulting cuts being in the general form of a cross. This is the position particularly shown in Fig. 2.

Further downward movement of the press 10 causes the cutting edges to continue their cutting of the skin of the potato and simultaneously brings into operation the inwardly extending fingers 11, 12, 13 and 14 of the press. As previously pointed out, these fingers are located within the angles formed by successive portions of the intersecting blades 20 and 21, and the fingers therefore are pressed down upon portions of the potato skin which are not cut by the blades. The downward force upon the potato skin at points spaced from the cuts formed by the cutting edges serves to force the interior potato meal toward the center of the potato and thence upwardly, thereby folding the flaps of cut skin backwardly away from the center as shown for example at 36 and 37 in Fig. 3.

The cutting press 10 may now be easily removed from the potato 30 by retracting the press upwardly, and the potato may be further buttered, garnished or otherwise prepared for serving.

Accordingly, it will be seen that I have provided a simple but effective device by which a baked potato may be prepared for serving, and no contact with the potato by the fingers of the user is necessary. It will be readily understood that minor modifications and variations from the specific form hereinabove shown and described are within the scope of the invention. For example, the vertical spacing between the lowermost point 26 of the cutting edges and the fingers of the frame may be varied considerably; the cutting edges 24 and 25 themselves need not slope downwardly at any specific angle in order to be operative, and may even be horizontal or virtually so as long as they are no higher than the fingers 11, 12, 13 and 14.

Additional modifications and changes from the specific embodiment shown will occur to those skilled in the art. Such modifications and changes not departing from the spirit of the invention are intended to be embraced with the scope of the appended claims.

I claim:

1. A manually graspable potato cutting press comprising: a horizontally disposed rigid frame generally in the shape of a hollow rectangle; intersecting cutting blades lying in vertical planes and carried by opposite portions of the frame and extending across the hollow interior thereof having downwardly directed cutting edges inclined downwardly and inwardly from the frame and intersecting at a point below the frame and in substantial alignment with the center thereof; and fingers carried by the frame and extending generally horizontally inwardly therefrom in the angles formed by said intersecting edges, the fingers being spaced substantially from said vertical planes and having lower surfaces provided with a smoothly rounded contour.

2. A manually graspable potato cutting press comprising: a horizontally disposed rigid frame generally in the shape of a hollow rectangle; intersecting cutting blades lying in vertical planes and carried by opposite portions of the frame and extending across the hollow interior thereof having downwardly directed cutting edges inclined downwardly and inwardly from the frame and intersecting at a point below the frame and in substantial alignment with the center thereof; and fingers carried by the frame and extending generally horizontally inwardly therefrom in the angles formed by said intersecting edges.

References Cited in the file of this patent

UNITED STATES PATENTS

| | | |
|---|---|---|
| 1,653,578 | Larsen | Dec. 20, 1927 |
| 2,214,217 | Adams | Sept. 10, 1940 |
| 2,263,173 | Johnson | Nov. 18, 1941 |
| 2,397,007 | Hosmer | Mar. 19, 1946 |

FOREIGN PATENTS

| | | |
|---|---|---|
| 779,242 | France | Jan. 10, 1935 |